(12) United States Patent
Schanin

(10) Patent No.: US 6,898,942 B2
(45) Date of Patent: May 31, 2005

(54) METHOD AND APPARATUS FOR CONSERVING POWER CONSUMED BY A REFRIGERATED APPLIANCE UTILIZING DISPENSING EVENT DATA SIGNALS

(75) Inventor: David J. Schanin, Denver, CO (US)

(73) Assignee: USA Technologies, Inc., Malvern, PA (US)

(*) Notice: Subject to any disclaimer, the term of this patent is extended or adjusted under 35 U.S.C. 154(b) by 0 days.

(21) Appl. No.: 10/350,567

(22) Filed: Jan. 24, 2003

(65) Prior Publication Data

US 2004/0112070 A1 Jun. 17, 2004

Related U.S. Application Data

(63) Continuation-in-part of application No. 10/151,513, filed on May 20, 2002, now Pat. No. 6,581,396, which is a continuation of application No. 09/579,411, filed on May 25, 2000, now Pat. No. 6,389,822, which is a continuation-in-part of application No. 09/182,586, filed on Oct. 28, 1998, now Pat. No. 6,243,626.

(51) Int. Cl.[7] .......................... G05D 23/32; A24F 27/14
(52) U.S. Cl. .................. 62/158; 221/150 R; 222/146.6; 236/47
(58) Field of Search ........................ 62/157, 158, 231, 62/131; 221/4, 7, 9, 150 R, 150 HC; 222/146.1, 146.6; 236/47

(56) References Cited

U.S. PATENT DOCUMENTS

| | | | |
|---|---|---|---|
| 4,417,450 A | 11/1983 | Morgan, Jr. et al. | 62/126 |
| 4,448,346 A | 5/1984 | Kuwaki et al. | 236/46 |
| 4,752,853 A | 6/1988 | Matsko et al. | 361/94 |
| 5,475,609 A | 12/1995 | Apothaker | 700/292 |
| 5,574,653 A | 11/1996 | Coomer et al. | 700/286 |
| 5,625,236 A | 4/1997 | Lefebvre et al. | 307/41 |
| 5,675,503 A | 10/1997 | Moe et al. | 700/296 |
| 5,696,695 A | 12/1997 | Ehlers et al. | 700/286 |
| 5,739,596 A | 4/1998 | Takizawa et al. | 307/66 |
| 5,761,083 A | 6/1998 | Brown, Jr. et al. | 700/296 |
| 5,868,274 A | 2/1999 | Lee | |
| 5,943,246 A | 8/1999 | Porter | 307/43 |
| 5,947,327 A | 9/1999 | Lee | |
| 5,962,989 A | 10/1999 | Baker | 315/294 |
| 6,104,968 A | 8/2000 | Ananth | 700/297 |
| 6,112,135 A | 8/2000 | Peterson et al. | 700/293 |
| 6,243,626 B1 | 6/2001 | Schanin | 700/286 |
| 6,389,822 B1 | 5/2002 | Schanin | 62/89 |
| 6,427,772 B1 * | 8/2002 | Oden et al. | 62/131 X |
| 6,581,396 B2 * | 6/2003 | Schanin | 62/180 |

* cited by examiner

Primary Examiner—Harry B. Tanner
(74) Attorney, Agent, or Firm—RatnerPrestia

(57) ABSTRACT

A refrigerated appliance that dispenses items includes a power source and a cooling system. Power control circuitry is electrically coupled between a power source (e.g., power cord coupled to a wall outlet) and components (for example, a compressor and one or more circulating fans of the cooling system) of the appliance. A controller, which is operably coupled to the power control circuitry, is adapted to manage the supply of electrical power to such components by intelligently transitioning between a normal-operation mode and at least one power-conserving mode. To achieve efficient power conservation, the controller automatically transitions between the at least one power-conserving mode and the normal-operation mode based upon at least one temperature signal, at least one dispensing event signal, and possibly other data signals supplied to the controller.

25 Claims, 9 Drawing Sheets

METHOD AND APPARATUS FOR CONSERVING POWER CONSUMED BY A REFRIGERATED APPLIANCE UTILIZING DISPENSING EVENT DATA SIGNALS

The present application is a continuation-in-part of U.S. application Ser. No. 10/151,513, filed on May 20, 2002, now U.S. Pat. No. 6,581,396 which is a continuation of U.S. patent application Ser. No. 09/579,411, filed on May 25, 2000, now U.S. Pat. No. 6,389,822, which is a continuation-in-part of U.S. patent application Ser. No. 09/182,586, filed on Oct. 28, 1998, now U.S. Pat. No. 6,243,626.

BACKGROUND OF THE INVENTION

1. Field of the Invention

The present invention relates to refrigerated dispensing appliances and, more particularly, to mechanisms for automatic control of electrical power supplied to the components of a refrigerated dispensing appliance in a manner that conserves electrical power consumption.

2. State of the Art

Refrigerated dispensing appliances (including vending machines and reach-in type beverage coolers) provide for cost-effective delivery of consumer items. In principle, they provide full-time product availability with minimal intervention by a human operator. However, full-time operation can result in wasted energy consumption as the machine may be on for long intervals of inactivity. The concern for energy consumption is especially acute in the case of refrigerated dispensing appliances.

Refrigerated dispensing appliances generally maintain their contents at a standard temperature on the order of 36° F. There can be various reasons for keeping the dispensable items cold. Cold generally helps preserve perishable food items. In some cases, for example, with soda and other beverages, the items may taste better chilled. In other cases, the refrigerated vending machine can be used in conjunction with a heating device, such as a microwave oven, to allow chilled food, e.g., such as sandwiches, to be heated to a desirable temperature before consumption.

Typically, the dispensable items are maintained within a chamber that is thermally insulated from the exterior of the machine. A cooling system withdraws heat from the chamber. The cooling system can include an evaporator, a compressor, a condenser, and a metering (flow constricting) device.

When the cooling system is on, coolant liquid, e.g., Freon, enters the evaporator. The evaporator is thermally coupled to the refrigerated chamber. The coolant liquid is generally colder than the chamber so that the coolant removes heat from the chamber. The liquid evaporates as it absorbs the heat. The evaporated coolant is pumped out of the evaporator through a suction line by a compressor. The compressor increases the pressure of the coolant, raising its temperature in the process. The pressurized coolant is then directed to a condenser via a discharge line. The condenser couples the coolant to a chilled environment. This causes the coolant to give up heat and condense into a liquid. The liquid flows through a liquid line, including the flow meter (which is basically a flow restriction) back to the evaporator to begin another cooling cycle. The evaporator removes heat from the nearby chamber air. To ensure that the cool air reaches the dispensable items and to ensure a uniform temperature within the chamber, the chamber air is circulated. Generally, one or more fans are operated within the chamber interior to effect this circulation.

One or more temperature sensors monitor the temperature inside the chamber. Typically, there is a desired temperature range for the vended items, for example, 0° to 2° C. (~32° F. to 36° F.) for cold drinks. When the chamber temperature reaches the higher threshold, the compressor is activated and the cooling process begins. When the chamber temperature falls to the lower threshold, the compressor is turned off, and cooling effectively halts. Another cooling cycle can begin when the temperature reaches the upper threshold due to inevitable heat transfer through the chamber wall.

Refrigerated dispensing appliances consume considerable electric power. Typically, most of the power consumed by a refrigerated dispensing appliance is consumed by the cooling system, and especially by the compressor, even though it is not operated continuously. However, the fans, the dispensing mechanism, the money handling mechanisms, panel lights, sensors, and control electronics all consume power. For reasons of energy conservation and cost, it is desirable to be able to reduce the energy consumed by a refrigerated dispensing appliance without adversely affecting its service (to patrons) and its economic viability (to the appliance owner).

The most straightforward approach to saving energy is to disconnect AC power. For example, a refrigerated vending appliance could be turned off during non-business hours, e.g., from 10 pm to 6 am. To avoid the inconvenience of manual activation and inactivation, an external timer can be used to control AC power to the vending machine. However, whether power to the vending machine is switched by a human operator or a timer, potential patrons are denied dispensable items during off hours. Additionally, most artificially-sweetened products deteriorate under such temperature cycling. Such temperature cycling also causes cold cans and bottles to "sweat" or develop a water film due to condensation.

Additionally, present cold drink dispensing machines are nearly all electronically controlled, having internal electronics to control operation of the cooling and possibly lighting systems, as well as cash collection and disbursement and possibly non-cash transactions (e.g. credit cards). However, reach-in type beverage coolers, lacking the requirements for cash management, are typically mechanically based, using a simple mechanical thermostat to regulate the operation of its cooling system.

U.S. Pat. No. 6,243,626, to Schanin, commonly assigned to assignee of the present invention, discloses an external power control system for a vending machine that includes an occupancy sensor. This can be used to ensure a vending machine is on whenever people are in its vicinity. An ambient thermo-sensor can also be included to determine a reactivation time to prevent the dispensable items from become unacceptably warm.

U.S. Pat. No. 6,389,822 to Schanin, commonly assigned to assignee of the present invention, discloses a refrigerated soda vending machine that includes temperature sensors for monitoring temperature within its refrigerated chamber and temperature of the ambient air external to the chamber, and an occupancy sensor for monitoring occupancy in the vicinity of the chamber. The sensor data is used to determine when to switch between a normal-operation mode and a power-conservation mode of operation. In the normal mode of operation, fans circulate air within the chamber to maintain a relatively uniform temperature throughout the chamber. During power-conservation mode, the fans are off most of the time the compressor is off. In the absence of circulation, the temperature within the refrigerated chamber stratifies so that a lower cool zone and an upper warm zone can be differentiated. Cold drink cans or bottles are held in vertical stacks so that the lowest product is located in the cool zone. Product is dispensed from the bottom of the stacks and thus only from the cool zone. The machine automatically switches from the power-conserving mode to the normal mode in the event that the occupancy sensor senses occupancy in the vicinity of the machine. With this arrangement, a patron can obtain an optimally chilled product even though the average temperature in the chamber is above the optimal temperature range. Thus, energy can be conserved and operating costs reduced while meeting patron's expectations for cold beverages at all times.

While these power-saving control mechanisms are effective in that there is no risk of lost sale due to a customer believing the machine is non-operational, such mechanisms are inefficient in many circumstances where people walking in the vicinity of the machine are not interested in buying products. In such circumstances, exiting the power-conserving mode based on occupancy is not efficient.

SUMMARY OF THE INVENTION

It is therefore an object of the invention to conserve energy usage by refrigerated dispensing appliances that dispense cool products.

It is another object of the invention to provide power-management control of a refrigerated dispensing appliance in a manner that affords efficient power conservation while maintaining suitable product temperature.

It is a further object of the invention to provide power-management control of a refrigerated dispensing appliance in a manner that affords efficient power conservation based upon sales or other product dispensing events associated with the operations of the refrigerated dispensing appliance.

It is an additional object of the invention to provide external power-management control of a refrigerated dispensing appliance in a manner that affords efficient power conservation based upon sales or other product dispensing events associated with the operations of the refrigerated dispensing appliance.

In accord with these objects, which will be discussed in detail below, a refrigerated dispensing appliance includes a power source and a cooling system. Power control circuitry is electrically coupled between a power source (e.g., power cord coupled to a wall outlet) and the components (for example, a compressor and one or more circulating fans of the cooling system) of the appliance. A controller is adapted to control the power control circuitry to thereby manage the supply of electrical power to such components by intelligently transitioning between a normal-operation mode and at least one power-conserving mode. In the power-conserving mode(s), the internal temperature of the appliance is maintained at a higher average temperature than in the normal-operation mode. Such operations save energy in several ways. First, the cooling cycles are less frequent, which reduces the number of times the cooling system has to start up and thus saves energy involved in starting up the cooling system. In addition, there is less heat transfer from the exterior while the average internal temperature is elevated. Finally, energy is saved while the circulating fans are off as less energy is used and less heat from fan motor(s) is dissipated into the refrigerated chamber.

To achieve efficient power conservation, the controller automatically transitions between the power-conserving mode(s) and the normal-operation mode based upon at least one temperature signal, at least one dispensing event data signal, and possibly other data signals supplied to the controller.

The dispensing event data signals supplied to the controller may be provided by a dispensing control module that manages the automatic dispensing operations of the appliance, or such dispensing event data signals may be captured by monitoring the data signals communicated between money handling module(s) and the dispensing control module. Alternatively, such dispensing event data signals may be supplied by one or more of the components that interface to the dispensing control module (e.g., a money handling module, product dispensing mechanism, selector button, etc), or by a mechanical switch or non-contact style sensor that is located near a product dispensing passageway and that identifies that a product has been dispensed.

The dispensing event data signals are indicative of one or more predetermined dispensing events that occur during dispensing operations. Such dispensing events may include, for example, the supply of any amount of currency to one or more money handling modules, the supply of the appropriate amount of currency to one or more money handling modules, some other event that occurs during automatic money handling operations performed by the money handling module and the dispensing controller, or an open-door-event that occurs when a customer opens the door of a reach-in type beverage cooler.

These features enable the refrigerated dispensing appliance to maintain a cooler average internal temperature when the appliance is actively dispensing items as compared to the average internal temperature when the appliance has been inactive in dispensing items. Such operations save energy as summarized above. In addition, these control operations maintain the internal refrigerated chamber of the appliance at a cooler temperature when the appliance is actively dispensing items, thus ensuring that the patrons receive items at the desired temperature.

According to one embodiment of the present invention, the refrigerated dispensing appliance is a refrigerated beverage vending machine having the intelligent power-management controller that performs normal-operating mode cooling control operations in addition to power-conserving mode cooling operations.

In another embodiment of the present invention, the intelligent power-management controller is part of a module that interrupts normal-operating mode cooling operations performed by a machine controller to provide power-conserving mode cooling control of the refrigerated beverage vending machine.

In a third embodiment of the present invention, the refrigerated dispensing appliance is a reach-in type beverage and/or food cooler having the intelligent power-management controller integral to the main housing of the cooler.

In a fourth embodiment of the present invention, the refrigerated dispensing appliance is a reach-in type beverage and/or food cooler having components of the intelligent power-management controller external to the main housing of the cooler.

Additional objects and advantages of the invention will become apparent to those skilled in the art upon reference to the detailed description taken in conjunction with the provided figures.

BRIEF DESCRIPTION OF THE DRAWINGS

in FIG. 7A, cooling system control is realized by electrical means; in FIG. 7B, cooling system control is realized by electrical means in additional to mechanical means.

DETAILED DESCRIPTION OF THE PREFERRED EMBODIMENTS

Figure 1:
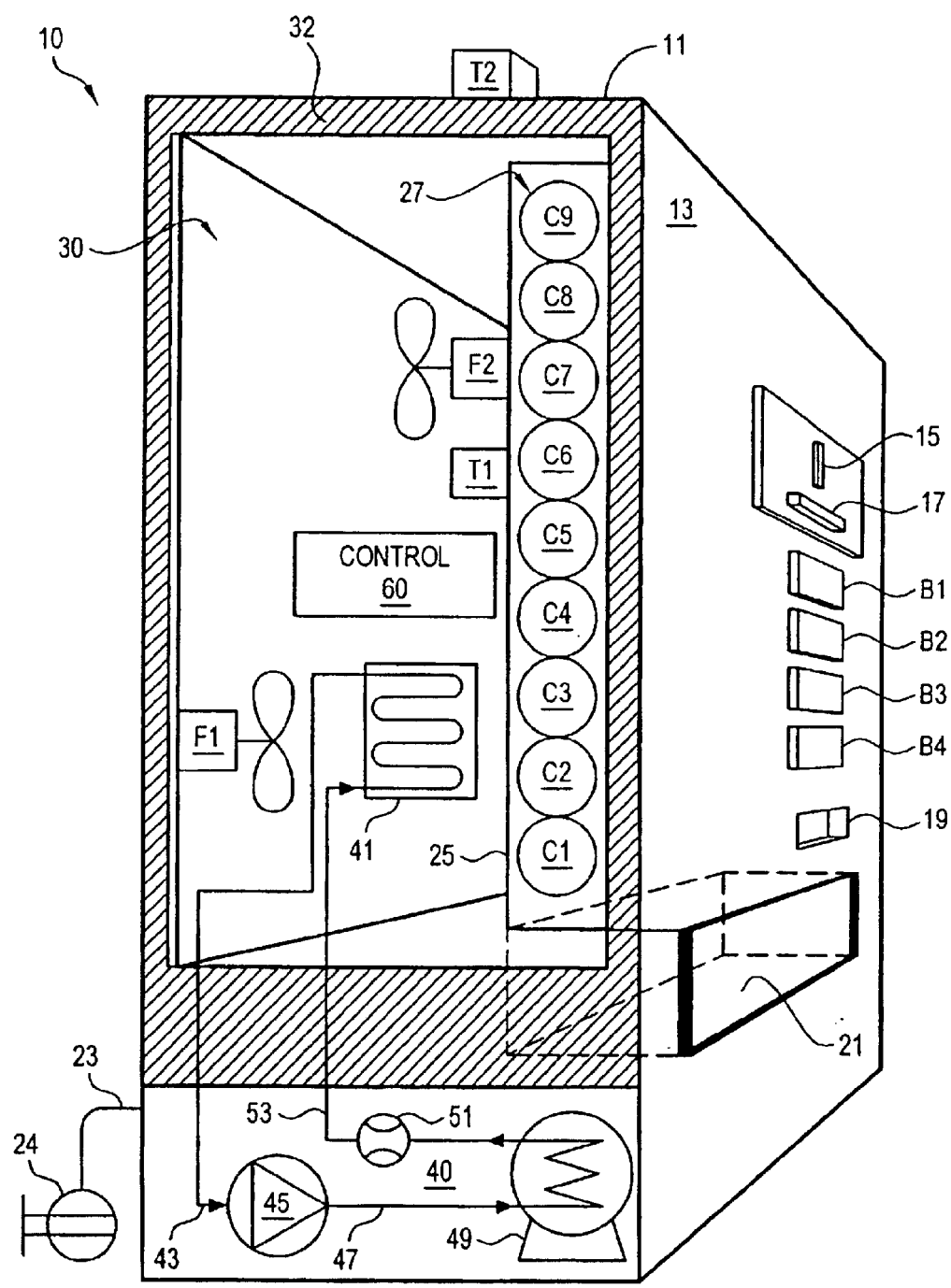
FIG. 1 is a schematic view of a refrigerated beverage vending machine in accordance with the present invention.

Turning now to FIG. 1, a refrigerated beverage vending machine 10 in accordance with the present invention includes a housing 11 with a front panel 13. The front panel includes a coin slot 15 and a bill slot 17, selection buttons B1, B2, B3, and B4, a coin return slot 19, and a dispensed beverage slot 21. Typically, a patron inserts a suitable amount of money in coin slot 15 and/or bill slot 17, depresses a selection button B1–B4, and receives a container of the selected beverage from slot 21. If the patron inserts more than the required amount for purchase, the vending machine 10 provides change at coin return slot 21. Power for vending machine 10 is through a power cord 23 plugged into an electric outlet 24 that supplies an AC power signal (e.g., 120 volt AC signal).

A beverage dispensing mechanism 25 holds beverage containers (e.g., cans) in four vertical stacks (one stack 27 shown). Each stack is intended to hold the type of beverages indicated by a respective one of the selection buttons B1–B4; for example, depressing button B1 serves as a request for an item from stack 27. In stack 27, nine containers C1–C9 are stacked. When a patron depresses button B1, dispensing mechanism 25 dispenses soda container C1. The remaining containers C2–C8 then move down, assisted by gravity, one soda-container position each. Dispensing mechanism 25 and the containers it holds are located within a chamber 30 that is thermally insulated from its exterior by insulation 32.

A cooling system 40 is used to keep chamber 30 and its contents near freezing so that the beverage containers disposed therein are optimally chilled. Cooling system 40 includes an evaporator 41, a suction line 43, a compressor 45, a discharge line 47, a condenser 49, and a flow meter 51 located along liquid line 53. Evaporator 41 is located within chamber 30 and withdraws heat therefrom. The remaining components of cooling system 40 serve to recycle the coolant so that it can remove heat continuously from chamber 30.

Figure 2:
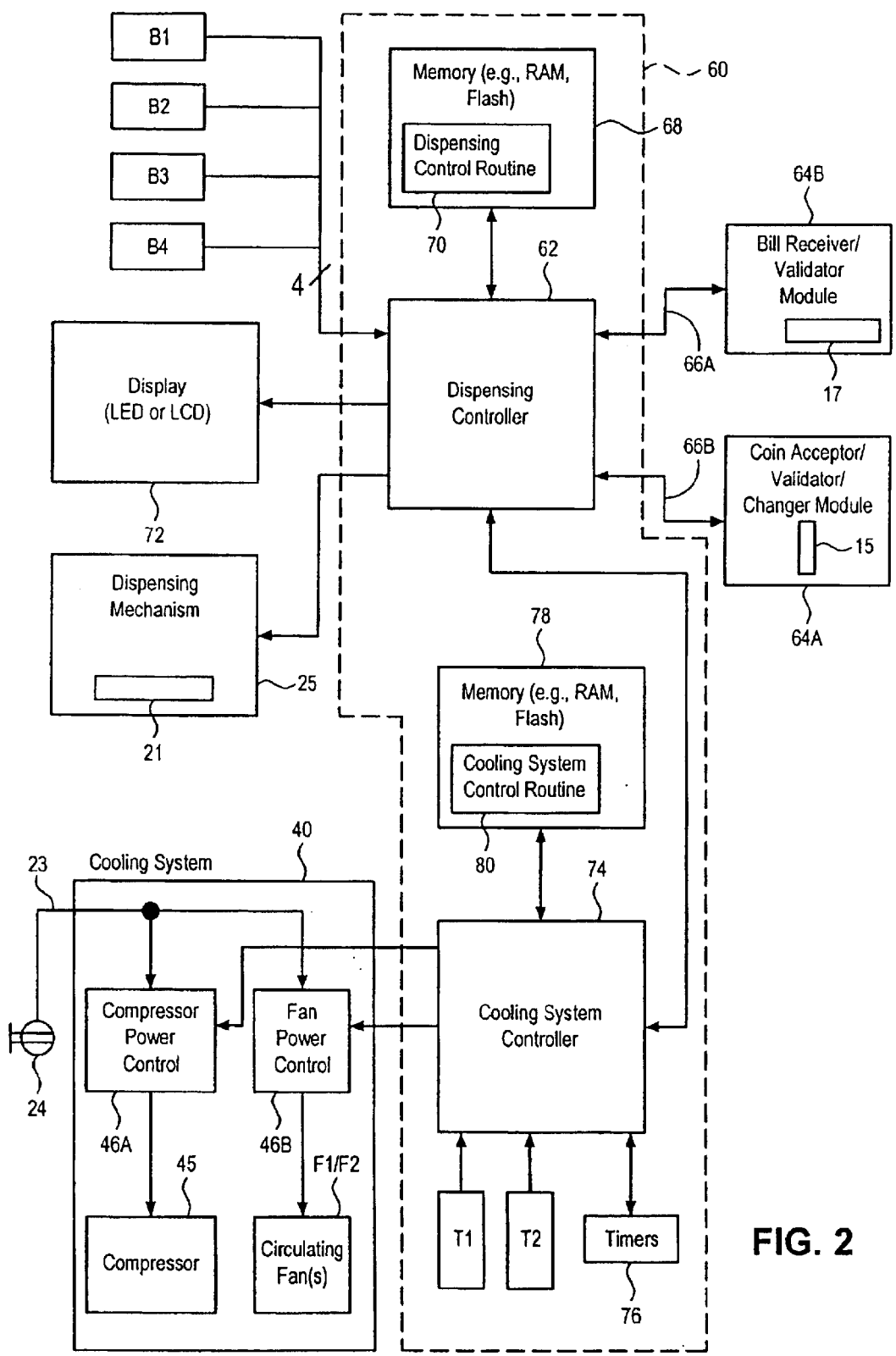
FIG. 2 is a schematic illustration of an exemplary internal power-management control system of the refrigerated beverage vending machine of FIG. 1 in accordance with the present invention.

Cooling system 40 primarily cools the air near evaporator 41. Fans F1 and F2 circulate air within chamber 30 so that the cool air chills the containers and their contents. In addition, this circulation ensures a relatively uniform temperature distribution, i.e., a relatively low temperature variance, within chamber 30. As shown in FIG. 2, the cooling system 40 also includes power control circuitry 46A and 46B; that are operably disposed between the power source (e.g., power cord 23 that is plugged into outlet 24) and the compressor 45 and the circulating fans F1 and F2, respectively. The power control circuitry 46A, 46B (which may be realized by relays or other power switching devices) switch on and off the supply of power to the compressor 45 and the circulating fans F1 and F2, respectively, in response to control signals supplied by the cooling system controller 74 as described below in more detail.

The vending machine 10 includes a control subsystem 60 that controls dispensing of beverage containers by the dispensing mechanism 25 and controls the supply of power to the cooling system 40 to provide for automatic power conservation. FIG. 2 illustrates a functional block diagram of the control subsystem 60 of the exemplary refrigerated vending machine of FIG. 1. As shown in FIG. 2, the control subsystem 60 includes a dispensing controller 62 operably coupled to at least one money handing module 64. Each money handling module 64 recognizes and validates currency supplied thereto (e.g., coins or bills inserted through slots 15, 17), generates data that provides an indication of the validated currency supplied thereto, and communicates such data to the dispensing controller 62 over a communication bus 66 therebetween. For example, the refrigerated vending machine 10 of FIG. 2 includes two money handling modules: a coin acceptor/validator/changer module 64A coupled to the dispensing controller 62 over a communication bus 66A; and a bill acceptor/validator module 64B coupled to the dispensing controller 62 over a communication bus 66B. The vending machine 10 may include additional money handling modules (not shown), such as a smart card reader that reads currency data stored in a smart card and/or a prepaid cash card. The communication buses 66A and 66B are shown as separate buses in FIG. 2; however they may be realized by a common bus operably coupled to multiple money handling modules, such as a serial multi-drop bus (MBD) commonly used in the vending arts.

The dispensing controller 62 is operably coupled to system memory 70, which is typically realized with both at least one persistent memory module, such as a Flash memory module or EEPROM memory module, and at least one non-persistent memory module, such as a DRAM memory module or an SRAM module. The system memory 70 persistently stores a dispensing control routine 72 that is loaded by the dispensing controller 62 for execution therein. The dispensing control routine 72 includes a sequence of instructions that, when executed by the dispensing controller 62, monitors the data signals supplied by each money handling module 64 over the communication bus 66 therebetween to count the amount of currency supplied by the patron and provide any change, if necessary. When the correct amount of currency has been supplied, the dispensing controller 62 monitors the status of the selection buttons B1–B4. When the user selects one of the buttons B1–B4, the dispensing controller 62 controls the dispensing mechanism 25 to dispense a beverage container corresponding to the selected button to the dispensing slot 21. The dispensing controller 62 may also interface to a LED display 72 (or LCD display) in order to provide status information during the dispensing operations or to provide other information to the patron (or potential patron).

The control subsystem 60 also includes a cooling system controller 74 operably coupled to temperature sensors T1 and T2 and to timer circuitry 76 as shown in FIG. 2. Temperature sensor T1 provides an indication of the internal temperature of the cavity 30 of the vending machine 10. Temperature sensor T2 provides an indication of the ambient temperature external to the machine 10. In addition, the cooling system controller 74 is operably coupled to system memory 78, which is typically realized with both at least one persistent memory module, such as a Flash memory module or EEPROM memory module, and at least one non-persistent memory module, such as a DRAM memory module or an SRAM module. The system memory 78 persistently stores a cooling system control routine 80 that is loaded by the cooling system controller 74 for execution therein. The cooling system control routine 80 includes a sequence of instructions that, when executed by the cooling system controller 74, monitors the data signals provided by the temperature sensors T1 and T2 and the dispensing event data signals preferably supplied by the dispensing controller 62, and automatically switches on and off the supply of electrical power to components (e.g., the cooling fans F1/F2 and the compressor 45) of the cooling system 40 in response to these data signals to maintain proper temperature in the chamber 30 while minimizing the energy consumed by the cooling system 40, and thus provide valuable energy savings.

The cooling system control routine 80, when executed by the controller 74, monitors the data signals supplied by the temperature sensors T1 and T2 to determine the vending machine temperature. Note that during the normal-operation mode, the vending machine temperature is provided by the data signal supplied by temperature sensor T1. However, during the power-conservation mode, the temperature sensor T1 provides a localized temperature reading that does not accurately reflect the average internal temperature of the machine 10. Such inaccuracy is caused by temperature stratification in the chamber 30 that stems from the circulating fans being turned off. To compensate for the inaccuracy of the temperature measurement provided by sensor T1 in the power-conservation mode, average internal temperature of the vending machine in the power-conservation mode is derived from the ambient temperature sensor T2.

In addition, the cooling system control routine 80 is preferably programmed with a lower threshold internal temperature and an upper threshold internal temperature. The vending machine operator can reset these thresholds as appropriate. In the present case, the lower threshold internal temperature is 0° C. and the upper threshold internal temperature is 2° C.

The cooling system controller 74 monitors data signals which are preferably supplied by the dispensing controller 62 as shown and which are indicative of one or more predetermined dispensing events that occur during dispensing operations. Such dispensing events may include, for example, the supply of any amount of currency to one or more money handling modules 64, the supply of the appropriate amount of currency to one or more money handling modules 64, the selection by the patron of any one of buttons B1–B4, and/or the final dispensing of a beverage to the patron through slot 21, any combination of such dispensing events, or any other dispensing event that occurs during automatic dispensing operations controlled by the dispensing controller 62. In response to such dispensing event data signals, the cooling system controller 74 preferably updates timer circuitry 76 to track the time from the last dispensing event. In alternate embodiments, the data signals which are monitored by the cooling system controller 74 and which are indicative of the predetermined dispensing events may be supplied by one or more of the components that interface to the dispensing controller 62 (e.g., the money handling module(s) 64, dispensing mechanism 25, selector buttons B1–B4, etc).

Timer circuitry 76 is used to provide other timing signals used in the control methodology (e.g., the compressor_off timer, shutdown timer as described below) The compressor_off timing signal is used to ensure that compressor 45 has been off for at least a minimum predetermined time period which allows the pressurized cooling system to de-compress. This enables the compressor to subsequently start without high head pressure, which could cause compressor 45 to stall and overheat.

In accordance with the present invention, the cooling system control routine 80 of vending machine 10 provides for intelligent on/off power control of the compressor 45 and circulating fans F1 and F2 of the cooling system 40. To turn on the compressor 45, the cooling system control routine 80 cooperates with the power control circuitry 46A to supply power to activate the compressor 45. This circulates the Freon refrigerant, and cools the chamber 30. To turn on the circulating fans F1 and F2, the cooling system control routine 80 cooperates with the power control circuitry 46B to supply power to activate fans F1 and F2 in order to minimize temperature variance within chamber 30. To turn the compressor 45 off, the cooling system control routine 80 cooperates with the power control circuitry 46A to remove the supply of power to the compressor 45, thereby shutting down the compressor 45. To turn the circulating fans F1 and F2 off, the cooling system control routine 80 cooperates with the power control circuitry 46B to remove the supply of power to fans F1 and F2, thereby shutting down fans F1 and F2.

While the algorithm used for entering, exiting, and transitioning between normal-operation mode and the power-conservation mode(s) is programmable, the default program determines the mode based on internal temperature of the chamber 30, ambient temperature (i.e., temperature of the environment where machine 10 is located), and dispensing events that occur during dispensing operations performed by the vending machine 10.

Figure 3:
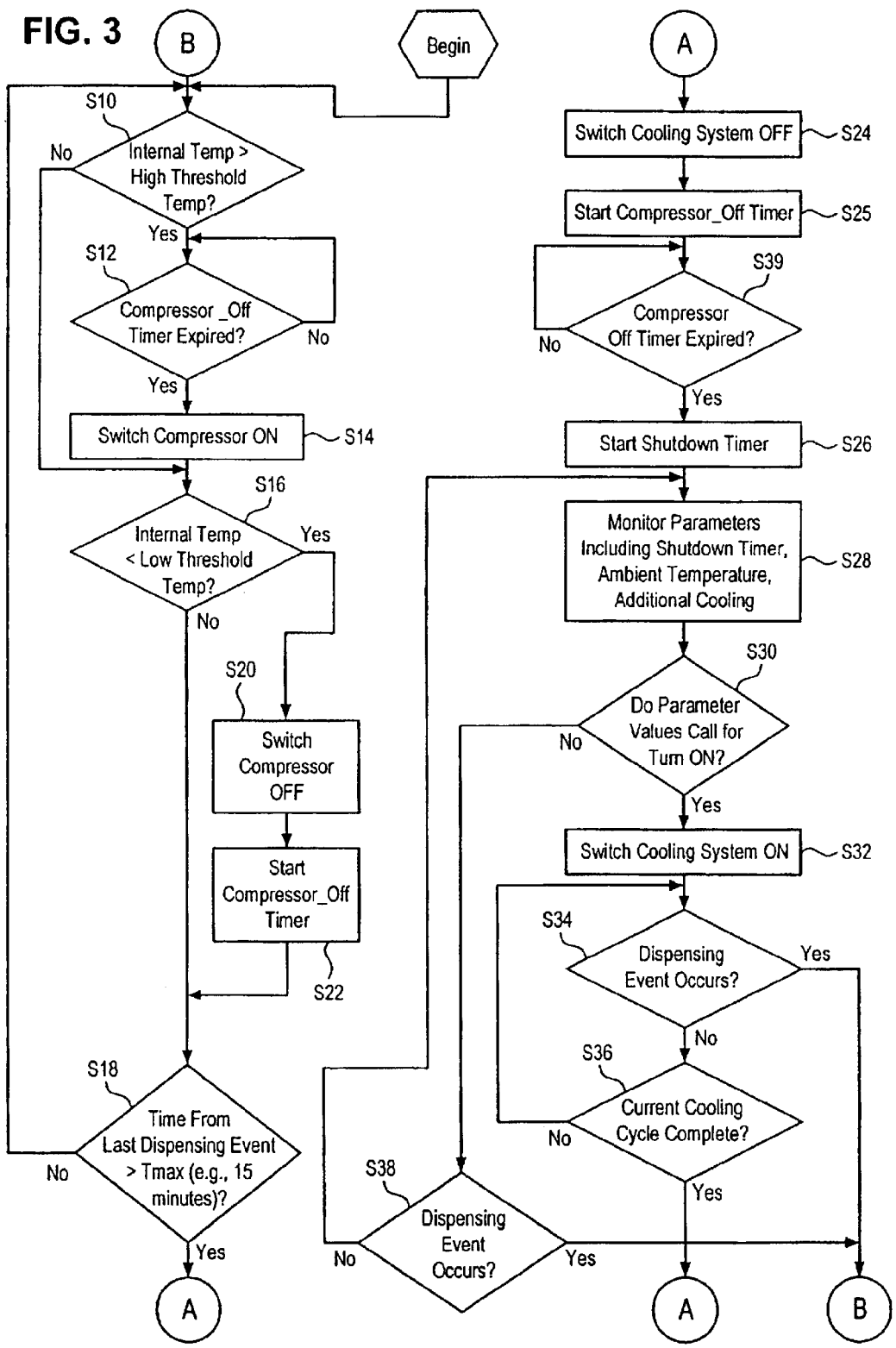
FIG. 3 is a flow chart of an exemplary power-management control scheme carried out by the power-management control system of FIG. 2.

An exemplary control methodology realized by the cooling system control module 80 in accordance with the present invention is illustrated in the flow chart of FIG. 3. Initially, the cooling system control module 80 enters the normal-operation mode in step S10. In step S10, the internal temperature of the chamber 30 is monitored to determine if the temperature is above the high threshold internal temperature. If not, the operation continues at step S16 as described below; otherwise the operation continues to at step S12 to ensure that the compressor_off_timer has expired. If the timer has not expired, the control routine waits in step S12 until the compressor_off_timer expires, and then proceeds to step S14. The compressor_off_timer, which is set in step S22, defines a predetermined minimum time period that the cooling system 40 will be turned off in the normal-operation mode. In step S14, the power to the cooling system 40 is switched on (via cooperation between routine 80 and power control circuitry 46A, 46B), thereby activating the compressor 45 and the circulating fans F1 and F2, and the operations proceed to step S16.

In step S16, the internal temperature of the chamber 30 is monitored to determine if the temperature is below the low threshold internal temperature. If so, the operation continues with steps S20 and S22; otherwise the operation continues to step S18.

In step S20, the cooling system control routine 80 cooperates with the power control circuitry 46A to deactivate the compressor 45, thereby turning the compressor 45 off. Note that the circulating fans F1 and F2 remain activated to minimize temperature variance in the chamber 30. In step S22, the compressor_off_timer is set to a predetermined time period, and the operations proceed to step S18.

In step S18, the time from the last dispensing event, which is provided by the timer circuitry 76, is monitored to determine if this time is greater than a predetermined maximum time (e.g., 15 minutes). If not, the cooling system control routine 80 remains in the normal-operation mode and returns back to step S10 to monitor the internal temperature of chamber 30; otherwise the operation jumps to the power-conservation mode which begins in step S24 as shown.

In step S24, the cooling system control routine 80 cooperates with the power control circuitry 46A to deactivate the compressor 45. In addition, the cooling system control routine 80 preferably cooperates with the control circuitry 46 to deactivate the circulating fans F1 and F2 to provide maximal power savings. The operation then continues to step S25.

In step S25, the compressor_off_timer is set to a predetermined time period, and the operations proceed to step S39. In step S39, the operation ensures that the compressor_off_timer has expired. If the timer has not expired, the control routine waits in step S39 until the compressor_off_timer expires, and then proceeds to step S26.

In step S26, the Shutdown Countdown Timer is started, and the operation proceeds to step S28.

In step S28, parameters including the shutdown timer, ambient temperature proved by temperature sensor T2 and possibly other parameters and data signals are monitored. For example, an additional parameter may be used to provide an indication that additional power-saving mode cooling cycles are required to be executed. At block S30, if it is found that the parameter values call for activating the cooling system 40, operations continue with step 32; otherwise, the operations jump to step S38 as described below.

In step S32, the compressor 45 and circulating fans F1 and F2 are turned on (via cooperation between routine 80 and power control circuitry 46A, 46B) and the operations proceed to S34. In step S34, the dispensing event data signals are monitored to determine if there is an occurrence of a predetermined dispensing event. As described above, the predetermined dispensing event may include, for example, the supply of any amount of currency to one or more money handling modules 64, the supply of the appropriate amount of currency to one or more money handling modules 64, the selection by the patron of any one of buttons B1–B4, and/or the final dispensing of a beverage to the patron through slot 21, any combination of such dispensing events, or any other dispensing event that occurs during automatic dispensing operations controlled by the dispensing controller 62. If the occurrence of a predetermined dispensing event data signal is identified in step S34, the operations exit the power-conservation mode and jump to the normal-operation mode which begins in step S10; otherwise the operations continue to step S36.

In step S36, a determination is made if the current cooling cycle is complete. The completion of the current cooling cycle can be based upon any number of parameters such as ambient temperature, internal chamber temperature, elapsed time, etc. If it is determined that the current cooling cycle is not complete, the operations return to step S34 to monitor the dispensing event signals. However, if it is determined that the current cooling cycle is complete, the operations return to step S24 to begin another cooling cycle in the power-conservation mode.

Returning to step 30, if the parameter values do not call for the cooling system to be turned on, the operations continue to step S38. In step S38, as in step S34, the dispensing event data signals are monitored to determine if there is an occurrence of a predetermined dispensing event. If said event has not occurred, the operations return back to step S28 to monitor the parameters for turn on. However, if said dispensing event has occurred, the operations return to step S10 and the normal-operation mode resumes.

Note that the parameter values (e.g., shutdown timer value, ambient temperature, etc.) that trigger switching the cooling system on in steps S28 to S32 of the power-conservation mode are selected such that the internal temperature of the appliance is maintained at a higher average temperature than in the normal-operation mode. Such operations save energy in several ways. First, the cooling cycles are less frequent, which reduces the number of times the cooling system has to start up and thus saves energy involved in starting up the cooling system. In addition, there is less heat transfer from the exterior while the average internal temperature is elevated. Finally, energy is saved while the circulating fans are off as less energy is used and less heat from fan motor(s) is dissipated into the refrigerated chamber. Moreover, because the control operations automatically exit the power-conservation mode and return to the normal-operation mode when the vending machine 10 is actively dispensing product, the vending machine 10 maintains a cooler average temperature of chamber 30 when the vending machine 10 is actively dispensing product (as compared to the average temperature of chamber 30 when the vending machine has been inactive in dispensing beverages for a predetermined time interval, e.g., the predetermined maximum time period in step S18). This ensures that patrons receive product at the desired temperature.

The operation of cooling system control routine 80 is programmable. The high and low internal temperature thresholds can be adjusted. Also, the predetermined maximum time period in step S18 can be adjusted. In addition, the cooling system controller 74 may interface to other sensors that can be used in controlling the mode of operation. For example, an absolute-time sensor, such as time-of-year sensor TOY, can be used to affect vending machine behavior at certain times of the day, on certain days of the week, and certain holidays, or an ambient temperature sensor external to the vending machine and/or an occupancy sensor can be used to control the mode of operation.

Moreover, one skilled in the art will realize that the dispensing controller 62 and cooling system controller 74 (in addition to the system memory 68 and the system memory 78) may be realized by a single microcontroller, a single microprocessor, or other programmable processing means.

Figure 4:
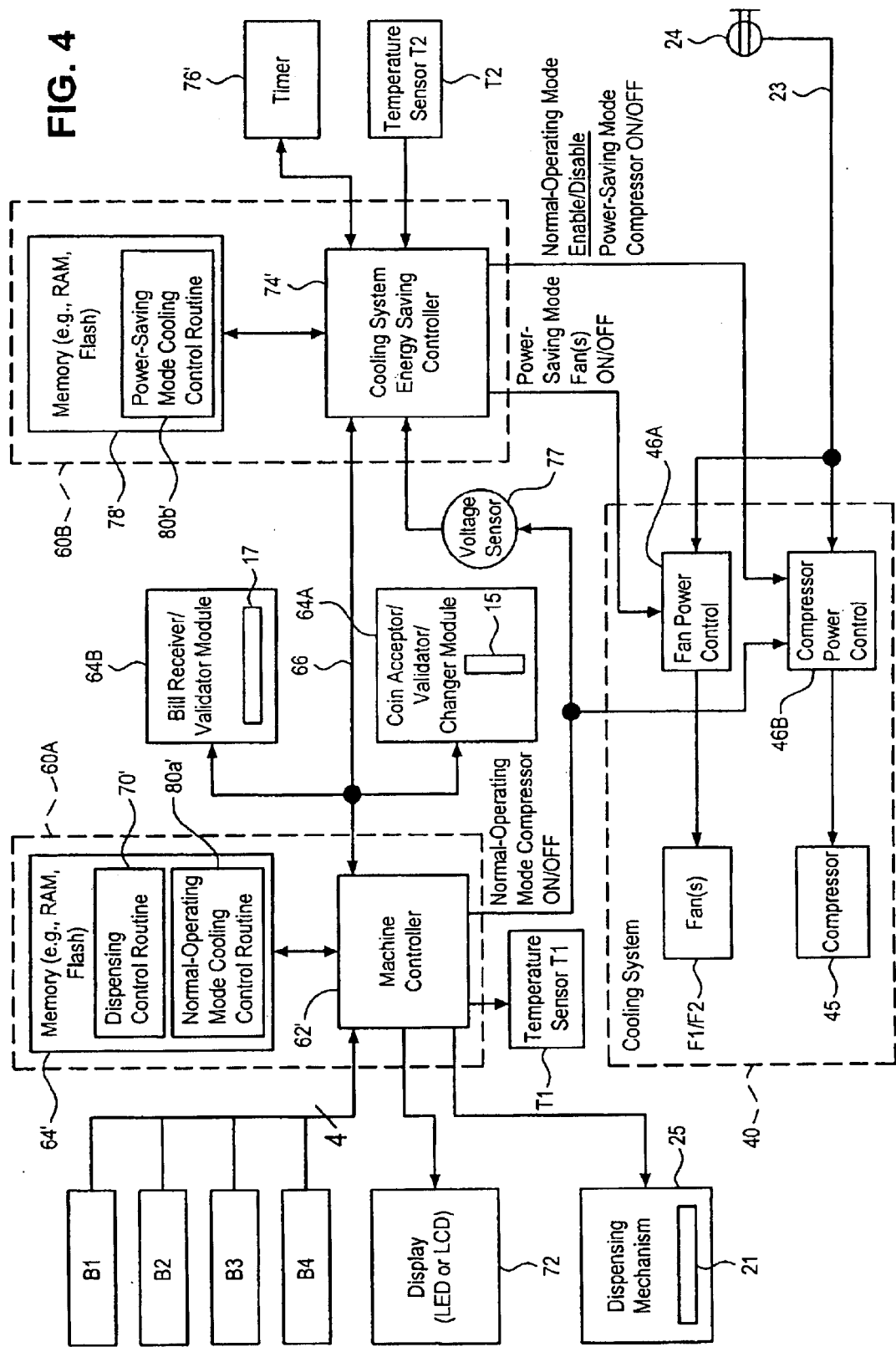
FIG. 4 is a schematic illustration of an exemplary power-management control system that interrupts normal-operating mode cooling operations performed by a machine controller to provide power-conserving mode cooling control of the refrigerated beverage vending machine of FIG. 1 in accordance with the present invention.

Turning now to FIG. 4, the cooling system power control operations of the present invention can be realized by a control system architecture that includes two separate and distinct control modules 60a and 60b as shown. The first control module 60a includes a machine controller 62 that is responsible for controlling dispensing operations and for normal-operation mode cooling operations. The second control module 60b includes an energy saving cooling system controller 74' that is responsible for managing supply of power to electrical components (including the fans F1 and F2 and the compressor 45 of the cooling system 40) of the vending machine 11' in the power-saving mode of operation in accordance with the power control operations of the present invention.

As shown in FIG. 4, the machine controller 62' is operably coupled to at least one money handling module 64. Each money handling module 64 recognizes and validates currency supplied thereto (e.g., coins or bills inserted through slots 15,17), generates data that provides an indication of the validated currency supplied thereto, and communicates such data to the machine controller 62' over a communication bus 66 therebetween. For example, the refrigerated vending machine 10' of FIG. 4 includes two money handling modules: a coin acceptor/validator/changer module 64A coupled to the machine controller 62' over a communication bus 66; and a bill acceptor/validator module 64B coupled to the machine controller 62' over communication bus 66. The vending machine 10' may include additional money handling modules (not shown) such as a smart card reader that reads currency data stored in a smart card and/or a prepaid cash card. Preferably, the communication bus 66 comprises a serial multi-drop bus (MDB) as is well known in the vending arts.

The machine controller 62' is also operably coupled to system memory 70', which persistently stores a dispensing control routine 72. As described above, the dispensing control routine 72 includes a sequence of instructions that, when executed by the machine controller 62', monitors the data signals supplied by each money handling module 64 over the communication bus 66 to count the amount of currency supplied by the patron and provide any change, if necessary. When the correct amount of currency has been supplied, the machine controller 62' monitors the status of the selection buttons B1–B4. When the user selects one of the buttons B1–B4, the machine controller 62' controls the dispensing mechanism 25 to dispense a beverage container corresponding to the selected button to the dispensing slot 21. The machine controller 62' may also interface to a LED display 72 (or LCD display) in order to provide status information during the dispensing operations or to provide other information to the patron (or potential patron).

The machine controller 62' is operably coupled to temperature sensor T1 and operably coupled to compressor power control circuitry 46B as shown. The temperature sensor T1 provides an indication of the internal temperature of the cavity 30 of the vending machine 10'. The compressor power control circuitry 46B, which may be realized by a relay or other power switching device, is operably coupled between the power source (e.g., outlet 24 and cord 23) and the compressor 45 of the machine's cooling system 40. The compressor power control circuitry 46B operates in either an on or off condition. In its on condition, the compressor power control circuitry 46B electrically couples the power source to the compressor 45. In its off condition, the compressor power control circuit 46B electrically decouples the compressor 45 from the power source. The compressor power control circuitry 46B has a control input that is coupled to the machine controller 62'. Through its connection to the control input, machine controller 62' controls when the compressor power control circuit 46B is in its on condition and when it is in its off condition.

In addition, the system memory 70' persistently stores a normal-operation mode cooling routine 80a'. The normal-operation mode cooling routine 80a' includes a sequence of instructions that, when executed by the machine controller 62', monitors the data signals provided by the temperature sensor T1 (and possibly other data signals) and switches the compressor power control circuitry 64B on and off in order to maintain the desired internal temperature of the chamber 30.

As described above, the second control module 60b is responsible for realizing power-conserving mode cooling control of the vending machine 10. It includes a cooling system energy saving controller 74' that is operably coupled to system memory 78', an ambient temperature sensor T2, timer circuitry 76', and voltage sensor 77, fan power control circuitry 46A and compressor power control circuitry 46B as shown. In addition, the cooling system energy saving controller 74' is operably coupled to the data communication bus 66 coupled between the money handling module(s) and the machine controller 62' via the data bus port 67 as shown.

The fan power control circuitry 46A, which may be realized by a relay or other power switching device, is operably coupled between the power source (e.g., outlet 24 and cord 23) and the circulating fans F1 and F2 of the machine's cooling system 40. The fan power control circuitry 46A operates in either an on or off condition. In its on condition, the fan power control circuitry 46A electrically couples the power source to the circulating fans. In its off condition, the fan power control circuit 46A electrically decouples the fans from the power source. The fan power control circuitry 46A has a control input that is coupled to cooling system energy saving controller 74'. Through its connection to the control input, controller 74' controls when the fan power control circuit 46A is in its on condition and when it is in its off condition.

As described above, the compressor power control circuit 46B operates in either an on or off condition to selectively supply power to the compressor 45. Through a connection to a control input of circuit 46B, the cooling system energy savings controller 74' controls when the compressor power control circuit 46B is in its on condition and when it is in its off condition.

The system memory 78' persistently stores a power-savings mode cooling system control routine 80b'. The power savings mode cooling system control routine 80b' includes a sequence of instructions that, when executed by the controller 74', monitors the data signals provided by the ambient temperature sensor T2, timer circuitry 76', voltage sensor 77, and the data signals communicated between the money handling module(s) 64 and the machine controller 62 over the communication bus 66. In response to these data signals, the controller 74' controls the power control circuit 46' to automatically switch on and off the supply of electrical power to components (e.g., the cooling fans F1/F2 and the compressor 45 of the cooling system 40 and possibly other electrical components) of the machine 10' to keep the beverages in the chamber of the vending machine 10' cool while minimizing the energy consumed by the cooling system 40, and thus provide valuable energy savings.

As described above, the cooling system controller 74' monitors the data signals communicated between the money handling module(s) 64 and the dispensing controller 62 over the communication bus 66, and switches the on/off operating modes of components of the cooling system 40 based upon these data signals. Such data signals are indicative of one or more predetermined dispensing events that occur during dispensing operations. Such dispensing events may include, for example, the supply of any amount of currency to one or more money handling modules 64, the supply of the appropriate amount of currency to one or more money handling modules 64, or other event(s) that occur(s) during automatic money handling operations performed by the money handling module and the dispensing controller 62. In alternate embodiments, the data signals which are monitored by the energy saving cooling system controller 74' and which are indicative of the predetermined dispensing events may be supplied by one or more of the components that interface to the dispensing controller 62 (e.g., the money handling module(s) 64, dispensing mechanism 25, selector buttons B1–B4, etc), or by a mechanical switch or non-contact style sensor that is located near the product delivery passage that leads to the dispensing slot 21 and that identifies that a product has been dispensed every time a product container (or can or bottle) passes by the switch in the delivery passageway.

In the control architecture of FIG. 4, two separate controllers (62' and 74') perform the normal-operation mode cooling control and the power-saving mode cooling control, respectively. In this configuration, both controllers 62' and 74' control the supply of power to the compressor 45 via control signals output to the compressor power control circuit 46B. To provide for maximal power savings, it is desirable that the energy saving controller 74' have the ability to selectively disable the normal-operation mode cooling operations performed by the machine controller 62'. This may be accomplished, for example, by adapting the power control circuitry 46B such that the energy-savings mode compressor on/OFF control signals supplied thereto by the energy saving controller selectively override (e.g., selectively disable) the normal-operation mode compressor on/OFF power supply control signals supplied thereto by the machine controller 62'. This control override feature occurs in response to a control signal (e.g., normal-operation mode enable/disable signal) supplied to the compressor power control circuit 46B by the energy saving controller 74'.

It is also desirable that the power-saving mode cooling operations begin upon completion of a compressor-on cooling cycle performed by the machine controller 62'. To automatically sense the completion of such compressor-on cooling cycles, voltage sensor 77 is provided. As shown in FIG. 4, voltage sensor 77 is operably coupled to the control line between the machine controller 62' and the corresponding control input of the compressor power control circuit 46B. The data signals generated by voltage sensor 77 are monitored by the cooling system energy saving controller 74' in order to identify completion of the compressor-on cooling cycles performed by the machine controller 62'.

While the algorithm used for entering, exiting, and transitioning between normal-operation mode and the power-conservation mode(s) is programmable, the default program determines the mode based on ambient temperature (i.e., temperature of the environment where machine 10 is located) and dispensing events that occur during dispensing operations performed by the vending machine 10.

Figure 5:
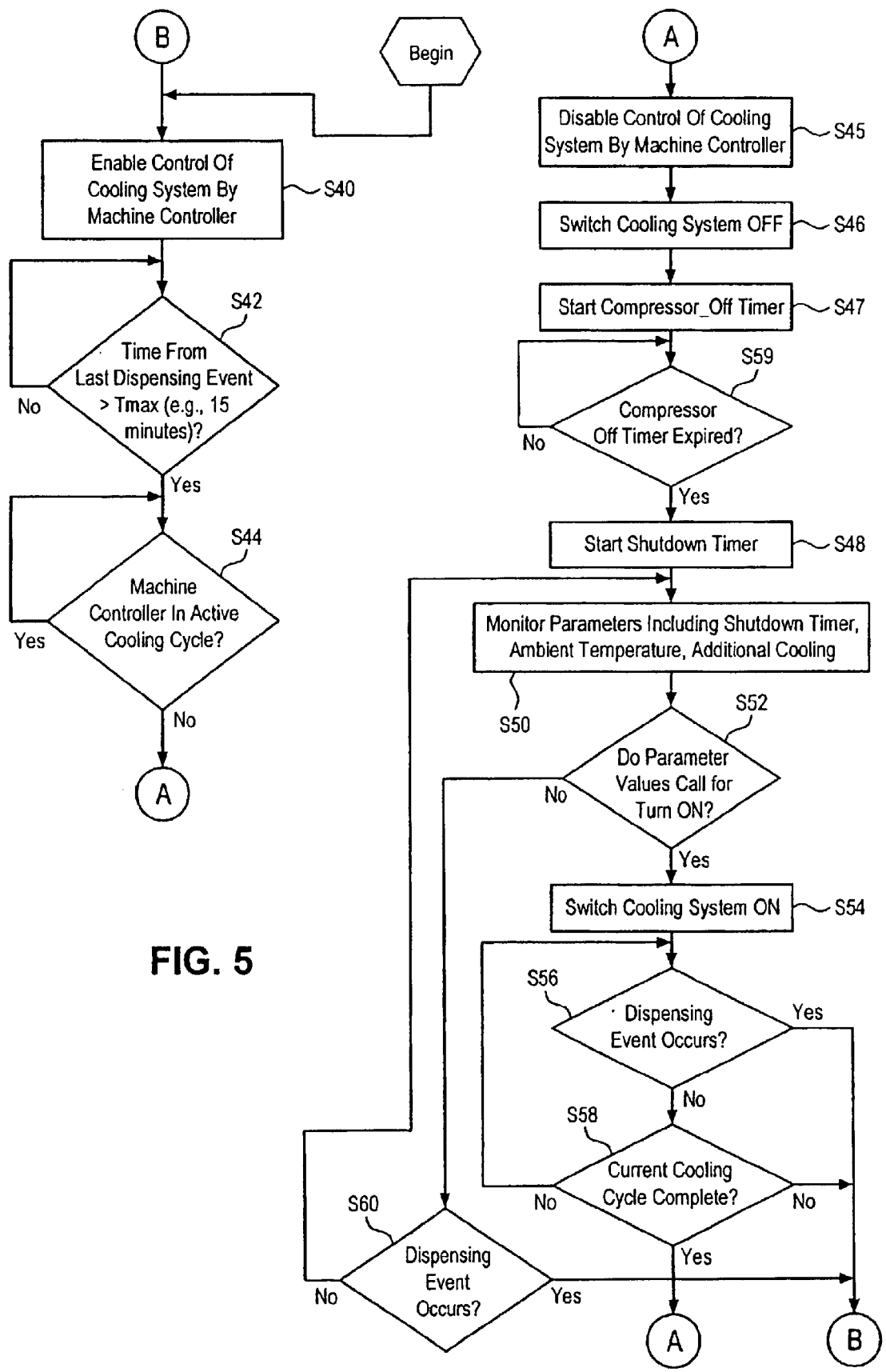
FIG. 5 is a flow chart of an exemplary power-management control scheme carried out by the power-management control system of FIG. 4.

An exemplary control methodology realized by the second control module 80b' in accordance with the present invention is illustrated in the flow chart of FIG. 5. Initially, the control operations enter the normal-operation mode in step S40. In step S40, the normal-operation mode cooling operations are enabled (for example, by supplying the normal-operation mode enable signal to the compressor power control circuitry 46B), and the operations continue to step S42.

In step S42, the time from the last dispensing event, which is provided by the timer circuitry 76, is monitored to determine if this time is greater than a predetermined maximum time (e.g., 15 minutes). If not, the cooling system control routine remains in the normal-operation mode and returns back to step S42 to monitor the time from the last dispensing event; otherwise the operation jumps to step S44 as shown.

In step S44, the operations determine if the machine controller 62' is in an active cooling cycle (for example, by monitoring the data signal supplied by the voltage sensor 77). If so, the operations return back to step 844 to wait until the active cooling cycle ends; otherwise the operation continues to the power-saving mode in step S45.

In step S45, the normal-operation mode cooling operations are disabled (for example, by supplying the normal-operation mode disable signal to the compressor power control circuitry 46B). As a result, the compressor power on/OFF control signals generated by the machine controller 62' are ignored. The operations continue to step S46.

In step S46, the power-savings mode cooling system control routine 80b' cooperates with the compressor power control circuitry 46B to deactivate the compressor 45. In addition, the power-savings mode cooling system control routine 80b' preferably cooperates with the fan power control circuitry 46A to deactivate the circulating fans F1 and F2 to provide maximal power savings. The operation then continues to step S47.

In step S47, the compressor_off_timer is set to a predetermined time period, and the operations proceed to step S59. In step S59, the operation ensures that the compressor_off_timer has expired. If the timer has not expired, the control routine waits in step S59 until the compressor_off_timer expires, and then proceeds to step S48.

In step S48, the Shutdown Countdown Timer is started, and the operation proceeds to step S50.

In step S50, parameters including the shutdown timer, ambient temperature proved by temperature sensor T2 and possibly other parameters and data signals are monitored. For example, an additional parameter may be used to provide an indication that additional power-saving mode cooling cycles are required to be executed. At block S52, if it is found that the parameter values call for activating the cooling system 40, operations continue to step S54; otherwise, the operations jump to step S60 as described below.

In step S54, the compressor 45 and circulating fans F1 and F2 are turned on (via cooperation between the power-savings mode cooling system control routine 80b' and the power control circuitry 46A, 46B) to activate the supply of power to the fans and the compressor, respectively, and the operations proceed to S56. In step S56, the dispensing event data signals are monitored to determine if there is an occurrence of a predetermined dispensing event. As described above, the predetermined dispensing event may include, for example, the supply of any amount of currency to one or more money handling modules 64, the supply of the appropriate amount of currency to one or more money handling modules 64, the selection by the patron of any one of buttons B1–B4, and/or the final dispensing of a beverage to the patron through slot 21, any combination of such dispensing events, or any other dispensing event that occurs during automatic dispensing operations controlled by the dispensing controller 62. If the occurrence of a predetermined dispensing event data signal is identified in step S56, the operations exit the power-conservation mode and jump to the normal-operation mode which begins in step S40; otherwise the operations continue to step S58.

In step S58, a determination is made if the current cooling cycle is complete. The completion of the current cooling cycle can be based upon any number of parameters such as ambient temperature, internal chamber temperature, elapsed time, etc. If it is determined that the current cooling cycle is not complete, the operations returns to step S56 to monitor the dispensing event signals. However, if it is determined that the current cooling cycle is complete, the operations return to step S45 to begin another cooling cycle in the power-conservation mode.

Returning to step S52, if the parameter values do not call for activating the cooling system, the operations jump to step S60. In step S60, as in step S56, the dispensing event data signals are monitored to determine if there is an occurrence of a predetermined dispensing event. If said event has not occurred, the operations return back to step S50 to monitor parameters for turn on. However, if said dispensing event has occurred, the operations return to step S40 and the normal-operation mode resumes.

Note that the parameter values (e.g., shutdown timer value, ambient temperature, etc.) that trigger switching the cooling system on in steps S50 to S54 of the power-conservation mode are selected such that the internal temperature of the appliance is maintained at a higher average temperature than in the normal-operation mode. Such operations save energy in several ways. First, the cooling cycles are less frequent, which reduces the number of times the cooling system has to start up and thus saves energy involved in starting up the cooling system. In addition, there is less heat transfer from the exterior while the average internal temperature is elevated. Finally, energy is saved while the circulating fans are off as less energy is used and less heat from fan motor(s) is dissipated into the refrigerated chamber. Moreover, because the control operations automatically exit the power-conservation mode and return to the normal-operation mode when the vending machine 10 is actively dispensing product, the vending machine 10 maintains a cooler average temperature of chamber 30 when the vending machine 10 is actively dispensing product (as compared to the average temperature of chamber 30 when the vending machine has been inactive in dispensing beverages for a predetermined time interval, e.g., the predetermined maximum time period in step S18). This ensures that patrons receive product at the desired temperature.

Also note that the compressor_off timer described above with respect to the normal-operation mode operations of FIG. 3 is not explicitly shown in FIG. 5; however, one skilled in the art will realize that this timer may be implemented by the machine controller 62' and used during the normal-operation mode cooling operations performed by the machine controller 62'.

The operation of the power-savings mode cooling system control routine 80b' is programmable. The predetermined maximum time period in step S42 can be adjusted. In addition, the energy savings controller 74' may interface to other sensors that can be used in controlling the mode of operation. For example, an absolute-time sensor, such as time-of-year sensor TOY, can be used to affect vending machine behavior at certain times of the day, on certain days of the week, and certain holidays, or an ambient temperature sensor external to the vending machine and/or an occupancy sensor can be used to control the mode of operation.

Figure 6:
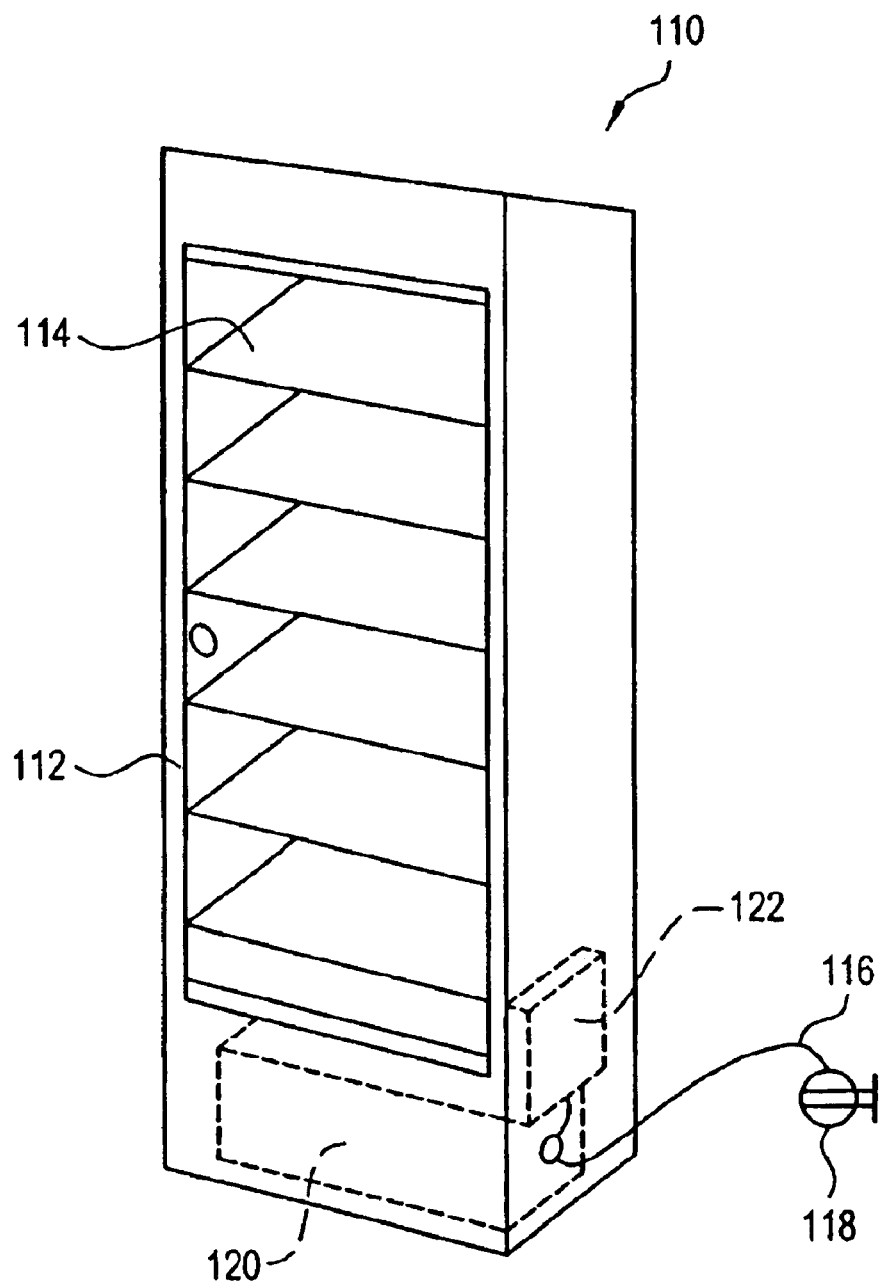
FIG. 6 is a schematic view of a reach-in type beverage cooler in accordance with the present invention.

Turning now to FIG. 6, the cooling system power control operations of the present invention can be used to control utilization of cooling system power in other refrigerated dispensing appliances, such as a glass front, consumer accessible cooler 110 (sometimes referred to as a reach-in cooler, slide cooler or visi-cooler) as shown. The cooler 110 includes a glass door 112 (which can slide open or pull open as shown) and a plurality of shelves 114. The shelves 114 support beverage containers (not shown) and other products such as sandwiches, fruit, etc. (not shown) that are all visible and therefore available for access by customers opening the glass door 112 and taking one or more products. A power cord 116 supplies electric power to the cooler 110 from an electric power source 118 (e.g., wall outlet as shown) that supplies an AC power signal (e.g., 120 volt AC signal). The cooler 110 also includes a cooling system 120 that cools the internal chamber to keep its contents cool so that the products disposed therein are chilled. Preferably, the cooling system 120 includes an evaporator, compressor, condenser, one or more circulating fans, and other components as described above with respect to the cooling system 40 of FIG. 1.

Figure 7A:
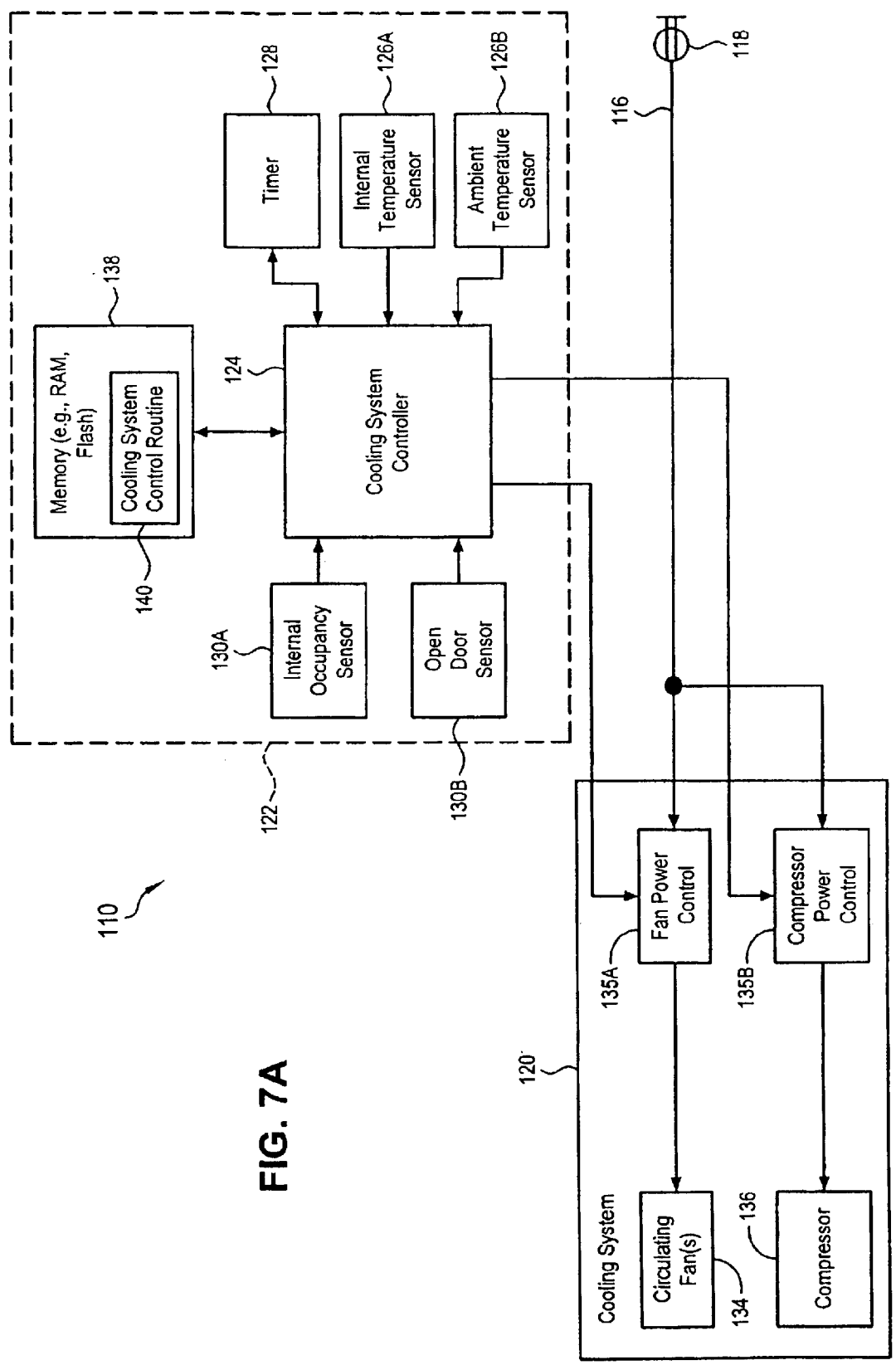
FIGS. 7A and 7B are schematic illustrations of two exemplary power-management control systems embodied in the reach-in type beverage and/or food cooler of FIG. 6 in accordance with the present invention.

In accordance with the present invention, the cooler 110 includes a power-management control module 122 that automatically manages the supply of power from the electric power source 118 to the components (including the compressor and the one or more circulating fans) of the cooling system 120. As shown in the functional block diagram of FIG. 7A, the control module 122 includes a cooling system controller 124 operably coupled to two temperature sensors 126A and 126B, timer circuitry 128, and one or more sensors 130. Temperature sensor 126A provide an indication of the internal temperature of the cooler 110. Temperature sensor 126B provides an indication of the ambient temperature (e.g., the air temperature in the vicinity of the cooler 110). The sensor 130 provides an indication that a customer has opened the door 112 to access the products inside the cooler 110. The sensor 130 may be realized by a passive infra-red occupancy sensor 130a that is disposed inside the cooler 110. In this configuration, the glass front door 112 does not pass any infra-red radiation such that the occupancy sensor 130a senses occupancy only when the glass door 112 is open and the customer accesses the cooler 110 for a product. Additionally, the thermal transient that occurs when the glass door 112 is open and warm air enters the cooler 110 may also trigger the occupancy sensor. Alternatively, the sensor 130 may be realized by a mechanical sensor 130b or non-contact style sensor that detects whether the glass door 112 is open or closed.

In addition, the control module 122 includes fan power control circuitry 135A and compressor power control circuitry 135B, that are operably disposed between the power source (e.g., power cord 116 that is plugged into power source 118) and the circulating fan(s) 136 and compressor 134, respectively, as shown. The power control circuitry 135A and 135B, which are preferably realized by relays or other power switching devices, switches on and off the supply of power to these components in response to control signals supplied by the cooling system controller 124.

The cooling system controller 124 is operably coupled to system memory 138, which is typically realized with both at least one persistent memory module, such as a Flash memory module or EEPROM memory module, and at least one non-persistent memory module, such as a DRAM memory module or an SRAM module. The system memory 138 persistently stores a cooling system control routine 140 that is loaded by the cooling system controller 124 for execution therein. The cooling system control routine 140 includes a sequence of instructions that, when executed by the cooling system controller 124, monitors the data signals provided by the temperature sensors 126A,126B and sensor(s) 130 and automatically switches on and off the supply of electrical power to components (e.g., the circulating fan(s) 134 and the compressor 136) of the cooling system 120 in response to these data signals to maintain proper internal temperature in the cooler 110 while minimizing the energy consumed by the cooling system 120, and thus provide valuable energy savings.

The cooling system control routine 140, when executed by the controller 124, monitors the data signals supplied by the temperature sensor 126A to determine the internal temperature of the cooler 110. Preferably, the cooling system control routine 140 is preprogrammed with a lower threshold internal temperature and an upper threshold internal temperature. The cooler operator can reset these thresholds as appropriate. In the present case, the lower threshold is 0° C. and the upper threshold is 2° C.

In addition, the cooling system controller 124 monitors data signals supplied by the sensor(s) 130 which are indicative that a customer has opened the door 112 to access the products inside the cooler 110. The occurrence of a customer opening door 112 (referred to herein as an "open-door-event") is a dispensing event that occurs during customer-performed dispensing operations in conjunction with the cooler 110. In response to the data signals supplied by the sensor(s) 130, the cooling system controller 124 preferably updates timer circuitry 128 to track the time from the last open-door-event.

In accordance with the present invention, the cooling system control routine 140 of cooler 110 provides for intelligent on/off power control of the compressor 136 and circulating fan(s) 134 of the cooling system 120. To turn on the compressor 136, the cooling system control routine 140 cooperates with the compressor power control circuitry 135B to supply power to activate the compressor 136. This circulates the Freon refrigerant, and cools the internal chamber of the cooler 110. To turn on the circulating fan(s) 134, the cooling system control routine 140 cooperates with the fan power control circuitry 135A to supply power to activate the fan(s) 134 in order to minimize temperature variance within the cooler 110. To turn off the compressor 136, the cooling system control routine 140 cooperates with the compressor power control circuitry 135B to remove the supply of power to the compressor 136, thereby shutting down the compressor 136. To turn off the circulating fan(s) 134, the cooling system control routine 140 cooperates with the fan power control circuitry 135A to remove the supply of power to fan(s) 134, thereby shutting down fan(s) 134.

While the algorithm used for entering, exiting and transitioning between normal-operation mode and the power-conservation mode(s) is programmable, the default program determines the mode based on internal temperature of the cooler 110, ambient temperature (i.e., temperature of the environment where cooler 110 is located), and dispensing events (e.g., open-door events) that occur during dispensing operations associated with the cooler 110.

Figure 8:
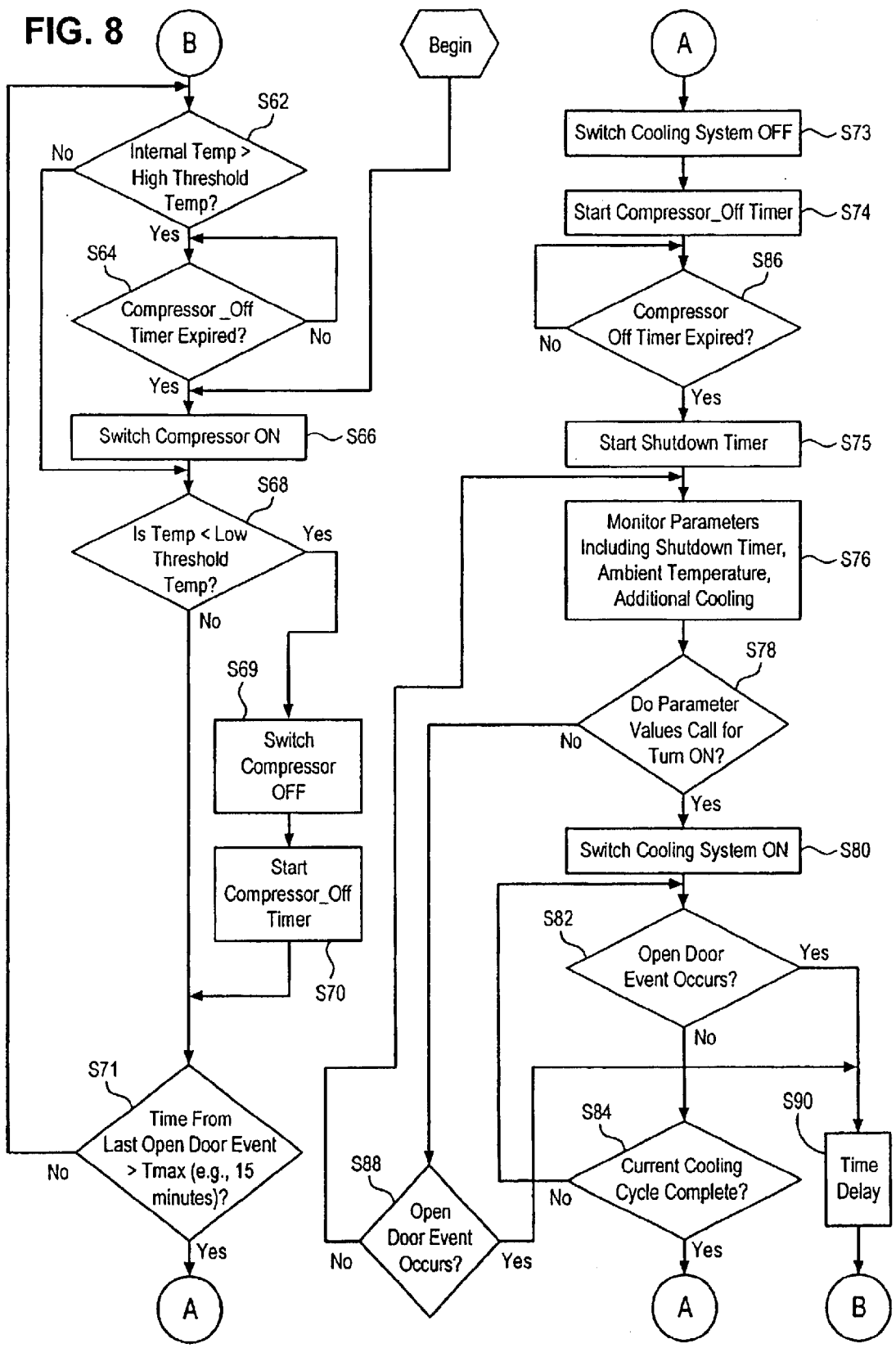
FIG. 8 is a flow chart of an exemplary power-management control scheme carried out by the power-management control system of FIGS. 7A and 7B.

An exemplary control methodology realized by the cooling system control module 140 in accordance with the present invention is illustrated in the flow chart of FIG. 8. Initially, the cooling system control module 140 enters the normal-operation mode in step S62. In step S62, the internal temperature of the cooler 110 is monitored to determine if the temperature is above the high threshold internal temperature. If not, the operation jumps to step S65 as described below; otherwise the operation continues to step S64 to ensure that the compressor_off_timer has expired. If the timer has not expired, the control routine waits in step S64 until the compressor_off_timer expires, and then proceeds to step S66. The compressor_off_timer, which is set in step S70, defines a predetermined minimum time period that the cooling system 120 will be turned off in the normal-operation mode. In step S66, the power to the cooling system 120 is switched on (via cooperation between routine 140 and power control circuits 135A and 135B), thereby activating the circulating fan(s) 134 and compressor 136, and the operations proceed to step S68.

In step S68, the internal temperature of the cooler 110 is monitored to determine if the temperature is below the low threshold internal temperature. If so, the operation continues with steps S69 and S70; otherwise the operation continues to step S71.

In step S69, the cooling system control routine 110 cooperates with the compressor power control circuitry 135A to deactivate the compressor 136, thereby turning the compressor 136 off. Note that the circulating fan(s) 134 remain activated to minimize temperature variance within the cooler 110. In step S70, the compressor_off_timer is set to a predetermined time period, and the operations proceed to step S71.

In step S71, the time from the last dispensing event, which is provided by the timer circuitry 128, is monitored to determine if this time is greater than a predetermined maximum time (e.g., 15 minutes). If not, the cooling system control routine 140 remains in the normal-operation mode and returns back to step S62 to monitor the internal temperature of the cooler 110; otherwise the operation jumps to the power-conservation mode which begins in step 873 as shown.

In step S73, the cooling system control routine 140 cooperates with the compressor power control circuitry 135B to deactivate the compressor 146. In addition, the cooling system control routine 140 preferably cooperates with the fan power control circuitry 135A to deactivate the circulating fan(s) 134 to provide maximal power savings. The operation then continues to step S74.

In step S74, the compressor_off_timer is set to a predetermined time period, and the operations proceed to step S86. In step S86, the operation ensures that the compressor_off_timer has expired. If the timer has not expired, the control routine waits in step S86 until the compressor_off_timer expires, and then proceeds to step S75.

In step S75, the Shutdown Countdown Timer is started, and the operation proceeds to step S76.

In step S76, parameters including the shutdown timer, ambient temperature proved by temperature sensor 126B and possibly other parameters and data signals are monitored. For example, an additional parameter may be used to provide an indication that additional power-saving mode cooling cycles are required to be executed. At block S78, if it is found that the parameter values call for active cooling of the cooler 110, operations continue with step S80; otherwise, the operations jump to step S88 as described below.

In step S80, the compressor 136 and circulating fan(s) 134 are turned on (e.g., power is supplied thereto via cooperation with the power control circuitry 135A, 135B) and the operations proceed to step S82. In step S82, the dispensing event data signals provided by sensors 130A and 130B are monitored to determine if there is an occurrence of a predetermined open-door event. If the occurrence of a predetermined open-door event is identified in step S82, the operations wait for a time delay in step S90, and exit the power-conservation mode and jump to the normal-operation mode which begins in step S62; otherwise the operations continue to step S84.

In step S84, a determination is made if the current cooling cycle is complete. The completion of the current cooling cycle can be based upon any number of parameters such as ambient temperature, internal temperature, elapsed time, etc. If it is determined that the current cooling cycle is not complete, the operations return to step S82 to monitor the dispensing event signals. However, if it is determined that the current cooling cycle is complete, the operations return to step S73 to begin another cooling cycle in the power-conservation mode.

Returning to step S78, if it is found that the parameter values do not call for active cooling of the cooler, the operations jump to step 88. In step S88, as in step S82, the dispensing event data signals are monitored to determine if there is an occurrence of a predetermined open-door event. If said event has not occurred, the operations return back to step S76 to monitor parameters for turn on. However, if said open-door event has occurred, the operations wait for a time delay in step S90, and return to step S62 and the normal-operation mode resumes.

Note that the parameter values (e.g., shutdown timer value, ambient temperature, etc.) that trigger switching the cooling system on in steps S76 to S80 of the power-conservation mode are selected such that the internal temperature of the cooler 110 is maintained at a higher average temperature than in the normal-operation mode. Such operations save energy in several ways. First, the cooling cycles are less frequent, which reduces the number of times the cooling system has to start up and thus saves energy involved in starting up the cooling system. In addition, there is less heat transfer from the exterior while the average internal temperature is elevated. Finally, energy is saved while the circulating fans are off as less energy is used and less heat from fan motor(s) is dissipated into the refrigerated chamber. Moreover, because the control operations automatically exit the power-conservation mode and return to the normal-operation mode when the cooler 110 is actively being used, the cooler 110 maintains a cooler average temperature when it is actively being used (as compared to the average internal temperature of the cooler 110 when it has not been used (e.g., inactive) for a predetermined time interval, e.g., the predetermined maximum time period in step S71). This ensures that patrons receive product at the desired temperature.

The operation of cooling system control routine 140 is programmable. The high and low internal temperature thresholds can be adjusted. Also, the predetermined maximum time period in step S71 can be adjusted. In addition, the cooling system controller 124 may interface to other sensors that can be used in controlling the mode of operation. For example, an absolute-time sensor, such as time-of-year sensor TOY, can be used to affect vending machine behavior at certain times of the day, on certain days of the week, and certain holidays, or an ambient temperature sensor external to the vending machine and/or an occupancy sensor can be used to control the mode of operation.

Figure 7B:
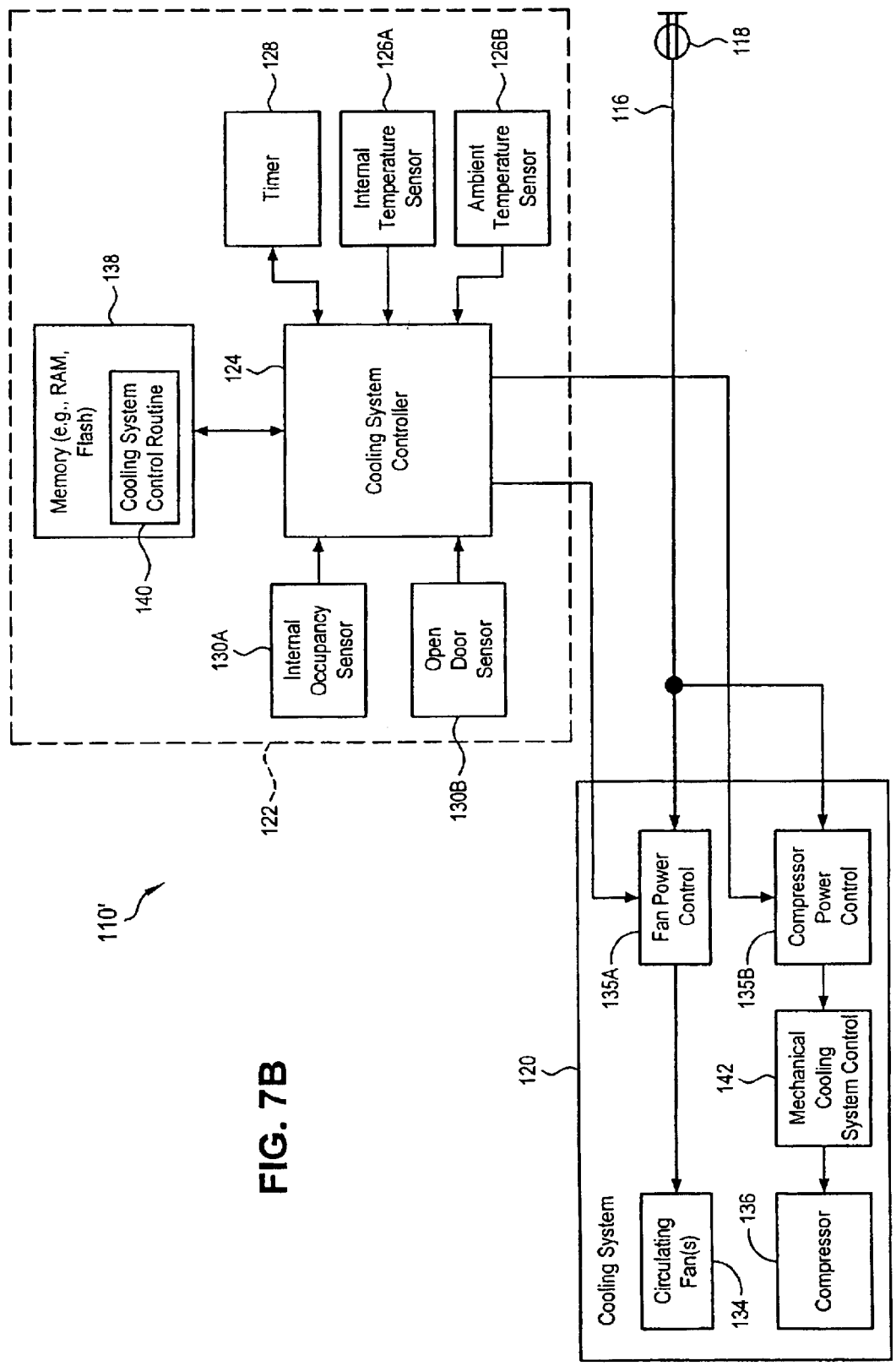

Note that reach-in type beverage coolers generally lack the requirements for cash management, and thus typically do utilize controller-based control (or other forms of electronic control) to regulate operation of the cooling system. Instead, these coolers typically utilize a mechanical control mechanism (such as a rheostat) that is operably disposed between the power source and the compressor 136 to regulate the operation of its cooling system. In such a system, the intelligent power management control as described above can be adapted to operate in conjunction with such mechanical power control to regulate the cooling system of the cooler 110' as shown in FIG. 7B. In FIG. 7B, the mechanical power control mechanism (e.g., rheostat) is labeled 142.

Also note that intelligent power management control module 122 as described above may be integral to the system housing of the cooler as shown in FIG. 6. Alternatively, certain components of the intelligent power management control module 122 as described above (such as the controller 124, memory 138, timer circuitry 128 and ambient temperature sensor 126B may be disposed in one or more external housings that are mounted on (or near) the system housing of the cooler 110.

There have been described and illustrated herein several embodiments of refrigerated appliances and power control modules/methodologies used therein that intelligently manage the supply of power to components of the cooling system of such appliances such that proper operating temperature is maintained while energy is conserved. While particular embodiments of the invention have been described, it is not intended that the invention be limited thereto, as it is intended that the invention be as broad in scope as the art will allow and that the specification be read likewise. Moreover, while particular configurations of control architectures and schemes have been disclosed, it will be appreciated that other configurations could be used as well. For example, and not by way of limitation, it is contemplated that the control schemes can automatically transition between the normal-operating mode and more than one power-saving mode of operation. Such power-saving modes might activate cooling based upon different ambient temperature levels. Alternatively, such power saving modes may be based on dynamic modulation of the power supplied to the cooling system components (e.g., circulating fan motor, compressor, etc). It will therefore be appreciated by those skilled in the art that yet other modifications could be made to the provided invention without deviating from its spirit and scope as claimed.

What is claimed is:

1. A refrigerated appliance for use with a power source to dispense items, said system comprising:
    a cooling system;
    power control circuitry that selectively provides electrically coupling of at least one component of said cooling system to said power source;
    a controller, operably coupled to said power control circuitry, that is adapted to control said power control circuitry in at least one power-conserving mode of operation and in a normal-operation mode, said controller automatically transitioning between said at least one power-conserving mode and said normal-operation mode based upon at least one dispensing event signal supplied to said controller by one of (i) a dispensing port sensor that senses items passing through a dispensing port of said refrigerated appliance, (ii) an occupancy sensor that senses occupancy of a user that opens a door to said refrigerated appliance, and (iii) an open door sensor that senses opening of a door to said refrigerated appliance.

2. A refrigerated appliance according to claim 1, wherein:
    said controller is adapted to automatically transition from said at least one power-conserving mode to said normal-operation mode in response to detection of a predetermined dispensing event that is identified by said at least one dispensing event signal.

3. A refrigerated appliance according to claim 2, wherein:
    said controller is adapted to automatically transition from said at least one power-conserving mode to said normal-operation mode after expiration of a predetermined delay period subsequent to detection of said predetermined dispensing event.

4. A refrigerated appliance according to claim 1, wherein:
said controller is adapted to automatically transition from said at least one power-conserving mode to said normal-operation based upon at least one parameter value.

5. A refrigerated appliance according to claim 4, wherein:
said at least one parameter value is selected from the group consisting of an ambient temperature value, internal temperature level, and a shutdown timer value.

6. A refrigerated appliance according to claim 1, wherein:
said at least one money handling module communicates to said dispensing controller over a communication bus therebetween; and
wherein said dispensing event signal is supplied to said controller over said communication bus.

7. A refrigerated appliance according to claim 1, wherein:
said appliance comprises a refrigerated vending machine.

8. A refrigerated appliance according to claim 1, wherein:
said appliance comprises a reach-in type cooler.

9. A refrigerated appliance according to claim 1, wherein:
average internal temperature of said appliance in said normal-operation mode is less than that in said at least one power-saving mode.

10. The power-management control system of claim 1, wherein said controller automatically transitions between said at least one power-conserving mode and said normal-operation mode based upon at least one other dispensing event signal supplied to said controller by a dispensing controller that interfaces to at least one money handling module and at least one item dispensing mechanism.

11. A refrigerated appliance for use with a power source to dispense items, said system comprising:
a cooling system;
power control circuitry that selectively provides electrically coupling of at least one component of said cooling system to said power source;
a controller, operably coupled to said power control circuitry, that is adapted to control said power control circuitry in at least one power-conserving mode of operation and in a normal-operation mode, said controller automatically transitioning between said at least one power-conserving mode and said normal-operation mode based uoon at least one dispensing event signal supplied to said controller by one of (i) a dispensing controller that interfaces to at least one money handling module and at least one item dispensing mechanism, (ii) a dispensing port sensor that senses items passing through a dispensing port of said refrigerated appliance, (iii) an occupancy sensor that senses occupancy of a user that opens a door to said refrigerated appliance, and (iv) an open door sensor that senses opening of a door to said refrigerated appliance;
wherein said controller is operably coupled to a timer that is adapted to track elapsed time from the last dIspensing event as indicated by said dispensing event signal, and wherein said controller is adapted to automatically transition from said normal-operation mode to said at least one power-conserving mode based upon detection that said elapsed time exceeds a predetermined threshold time.

12. A refrigerated appliance for use with a power source to dispense items, said system comprising:
a cooling system;
power control circuitry that selectively provides electrically coupling of at least one component of said cooling system to said power source; and a controller, operably coupled to said power control circuitry, that is adapted to control said power control circuitry in at least one power-conserving mode of operation and in a normal-operation mode, said controller automatically transitioning between said at least one power-conserving mode and said normal-operation mode based upon at least one dispensing event signal supplied to said controller by one of (i) a dispensing controller that interfaces to at least one money handling module and at least one item dispensing mechanism, (ii) a dispensing port sensor that senses items passing through a dispensing port of said refrigerated appliance, (iii) an occupancy sensor that senses occupancy of a user that opens a door to said refrigerated appliance, and (iv) an open door sensor that senses opening of a door to said refrigerated appliance;
wherein said cooling system includes a compressor, and said power control circuitry is adapted to selectively couple said compressor to said power source in both said at least one power-saving mode and said normal-operation mode.

13. A refrigerated appliance for use with a power source to dispense items, said system comprising:
a cooling system;
power control circuitry that selectively provides electrically coupling of at least one component of said cooling system to said power source; and
a controller, operably coupled to said power control circuitry, that is adapted to control said power control circuitry in at least one power-conserving mode of operation and in a normal-operation mode, said controller automatically transitioning between said at least one power-conserving mode and said normal-operation mode based upon at least one dispensing event signal supplied to said controller by one of (i) a dispensing controller that interfaces to at least one money handling module and at least one item dispensing mechanism, (ii) a dispensing port sensor that senses items passing through a dispensing port of said refrigerated appliance, (iii) an occupancy sensor that senses occupancy of a user that opens a door to said refrigerated appliance, and (iv) an open door sensor that senses opening of a door to said refrigerated appliance;
wherein said cooling system includes a circulating fan, and said power control circuitry is adapted to couple said circulating fan to said power source in said normal-operation mode and decouple said circulating fan from said power source in said at least one power-savings mode.

14. A power-management control system for managing supply of power supplied by a power source to the cooling system of a refrigerated appliance, the power-management control system comprising:
power control circuitry that selectively provides electrically coupling of at least one component of the cooling system to said power source; and
a controller, operably coupled to said power control circuitry, that is adapted to selectively operate in at least one power-conserving mode of operation and in a normal-operation mode, said controller automatically transitioning between said at least one power-conserving mode and said normal-operation mode based upon at least one dispensing event signal supplied to said controller by one of (i) a dispensing port sensor that senses items passing through a dispensing port of said refrigerated appliance, (ii) an occupancy sensor that senses occupancy of a user that opens a door to said refrigerated appliance, and (iii) an open door sensor that senses opening of a door to said refrigerated appliance.

15. A power-management control system according to claim 14, wherein:

said controller is adapted to automatically transition from said at least one power-conserving mode to said normal-operation mode in response to detection of a predetermined dispensing event that is identified by said at least one dispensing event signal.

16. A power-management control system according to claim 15, wherein:

said controller is adapted to automatically transition from said at least one power-conserving mode to said normal-operation mode after expiration of a predetermined delay period subsequent to detection of said predetermined dispensing event.

17. A power-management control system according to claim 14, wherein:

said controller is adapted to automatically transition from said at least one power-conserving mode to said normal-operation mode based upon at least one parameter value.

18. A power-management control system according to claim 17, wherein:

said at least one parameter value is selected from the group consisting of an ambient temperature value, internal temperature level, and a shutdown timer value.

19. A power-management control system according to claim 18, further comprising:

at least one of a temperature sensor that senses ambient temperature, an internal temperature sensor, and timer circuitry that tracks elapsed time from shutdown.

20. A power-management control system according to claim 14, wherein:

said controller is external to said refrigerated appliance.

21. A power-management control system according to claim 14, wherein:

said controller is internal to said refrigerated appliance.

22. A power-management control system according to claim 14, wherein:

said refrigerated appliance comprises a vending machine.

23. A power-management control system according to claim 14, wherein:

said refrigerated appliance comprises a reach-in type cooler.

24. The power-management control system of claim 14, wherein said controller automatically transitions between said at least one power-conserving mode and said normal-operation mode based upon at least one other dispensing event signal supplied to said controller by a dispensing controller that interfaces to at least one money handling module and at least one item dispensing mechanism.

25. A power-management control system for managing supply of power supplied by a power source to the cooling system of a refrigerated appliance, the power-management control system comprising:

power control circuitry that selectively provides electrically coupling of at least one component of the cooling system to said power source;

a controller, coperably coupled to said power control circuitry, that is adapted to selectively operate in at least one power-conserving mode of operation and in a normal-operation mode, said controller automatically transitioning between said at least one power-conserving mode and said normal-operation mode based uoon at least one dispensing event signal supplied to said controller by one of (i) a dispensing controller that interfaces to at least one money handling module and at least one item dispensing mechanism, (ii) a dispensing port sensor that senses items passing through a dispensing port of said refrigerated appliance, (iii) an occupancy sensor that senses occupancy of a user that opens a door to said refrigerated appliance, and (iv) an open door sensor that senses opening of a door to said refrigerated appliance; and a timer, operably coupled to said controller, that is adapted to track elapsed time from the last dispensing event as indicated by said dispensing event signal, and wherein said controller is adapted to automatically transition from said normal-operation mode to said at least one power-conserving mode upon detection that said elapsed time exceeds a predetermined threshold time.

* * * * *